(12) United States Patent
Hashimoto

(10) Patent No.: US 7,701,139 B2
(45) Date of Patent: Apr. 20, 2010

(54) ELECTRIC DISCHARGE LAMP

(75) Inventor: Masafumi Hashimoto, Tokyo (JP)

(73) Assignee: NEC Lighting, Ltd. (JP)

( * ) Notice: Subject to any disclaimer, the term of this patent is extended or adjusted under 35 U.S.C. 154(b) by 291 days.

(21) Appl. No.: 11/768,136

(22) Filed: Jun. 25, 2007

(65) Prior Publication Data
US 2008/0012489 A1    Jan. 17, 2008

(30) Foreign Application Priority Data
Jul. 12, 2006    (JP) .............................. 2006-191980

(51) Int. Cl.
*H01K 1/00*    (2006.01)
(52) U.S. Cl. .......................................... 313/580; 313/37
(58) Field of Classification Search .................... 313/37, 313/39, 580; 315/119; 337/20, 142, 17, 337/401
See application file for complete search history.

(56) References Cited
U.S. PATENT DOCUMENTS 2,177,705 A * 10/1939 Friederich .................... 313/486
4,649,320 A * 3/1987 Hough et al. ............... 315/100
5,977,692 A    11/1999 Itaya et al. .................... 313/37
6,653,782 B2 * 11/2003 Vallabhaneni et al. ....... 313/578

FOREIGN PATENT DOCUMENTS

| JP | 64-43387 | 3/1989 |
|---|---|---|
| JP | 2-192650 | 7/1990 |
| JP | 3-144685 | 6/1991 |
| JP | 04-061740 | 2/1992 |
| JP | 08-124420 | 5/1996 |
| JP | 10-334792 | 12/1998 |
| JP | 11-203934 | 7/1999 |

* cited by examiner

*Primary Examiner*—Peter Macchiarolo
(74) *Attorney, Agent, or Firm*—Hayes Soloway P.C.

(57) ABSTRACT

The present invention includes an electrode having a filament with the end of each lead wire connected to each end of the filament, a cylindrical glass tube in which the electrode is provided, and a thermal fuse which is electrically connected to the lead wires in series, and is provided near the electrode on an outer peripheral surface of the glass tube, wherein, when a position on the outer peripheral surface of the glass tube which extends in a radial direction of the glass tube from a connecting portion of the filament and the lead wire, serve as a reference position, in case where the diameter of the glass tube is 8 mm or more, the thermal fuse is arranged at a distance of 1.5 mm or less from the reference position in the longitudinal direction of the glass tube.

2 Claims, 2 Drawing Sheets

ELECTRIC DISCHARGE LAMP

This application is based upon and claims the benefit of priority from Japanese patent application No. 2006-191980, filed on Jul. 12, 2006, the disclosure of which is incorporated herein in its entirety by reference.

BACKGROUND OF THE INVENTION

1. Field of the Invention

The present invention relates to an electric discharge lamp, such as a fluorescent lamp, having an electrode with a filament and lead wires connected thereto.

2. Description of the Related Art

Generally, a hot cathode electric discharge lamp includes a pair of electrodes inside and at each end of a cylindrical glass tube. The electrode of the electric discharge lamp, comprises a filament connected to lead wires which extend through and are supported by a stem formed in an end portion of the glass tube.

In this kind of hot cathode electric discharge lamp, an anomalous discharge may be caused: after an emissive material (emitter) depletion at the end of the lamp's life, by a preheating current increase, or by an electrode material or lead wire material dispersing and adhering on the surface of the stem. When this occurs, the electric discharge lamp will generate heat by a short circuiting of the lead wires and the preheating current will flow on the surface of the stem, creating the possibility of melting the glass around the stem and the glass tube.

To prevent the stem and the glass tube from melting by an anomalous discharge of a hot cathode electric discharge lamp, Japanese Patent Laid-Open No. 11-203934 (hereafter JP '934) discloses a construction of a thermal fuse which interrupts current flow at the time of an anomalous discharge. The JP '934 patent publication discloses the construction of a thermal fuse positioned on an outer peripheral surface of the glass tube near an electrode.

According to JP '934, at the time of an anomalous discharge, temperature will have the tendency to increase faster at a location near the electrode and increase slower at locations further from the electrode in a longitudinal direction of the glass tube. For this reason, there is an issue that variation of temperature detected by the thermal fuse will be significant, depending on the installation position of the thermal fuse.

Nevertheless, in the technology disclosed in JP '934 mentioned above, the location of the thermal fuse with respect to the electrode is ambiguous. JP '934 neither discloses nor suggests the relative position between the thermal fuse and the electrode, nor does it teach the relationship between the diameter of the glass tube and the placement of the thermal fuse. JP '934 only discloses a possibility that the variation in operating temperature of the thermal fuse may be significant depending on the thermal fuse is located.

There is also a need to avoid relatively high temperatures in an electric discharge lamp used as a back light source for a transmissive liquid crystal display (LCD). In a transmissive LCD, variation in the operating temperature of a thermal fuse may adversely affect components used to manufacture an LCD well before and even if the glass and stem area do not reach the melting point.

SUMMARY OF THE INVENTION

The present invention aims at providing an electric discharge lamp which can reduce variation in operating temperatures detected by the thermal fuse when the emissive material of an electrode is exhausted and an anomalous discharge is caused, and by which said thermal fuse interrupts current flow before the temperature of any part of a glass tube, including the glass/stem region, becomes relatively high.

In order to achieve this objective, the electric discharge lamp according to the present invention includes: an electrode comprising a filament with lead wires connected to each end of the filament, a cylindrical glass tube in which the electrode is provided, a thermal fuse which is electrically connected in series to the lead wires, and is provided near the electrode on an outer peripheral surface of the glass tube at a specific reference position, which reference position extends in a radial direction of the glass tube from an internal connecting point of the filament, and the lead wire, the diameter of the glass tube is 8 mm or more, the thermal fuse is arranged at a distance of 1.5 mm or less from the reference position in the longitudinal direction of the glass tube.

In the electric discharge lamp according to the present invention described above, when an anomalous discharge occurs, variation of operating temperature detected by the thermal fuse on the outer peripheral surface of the glass tube is suppressed and electrical power will be interrupted by the thermal fuse before the temperature of any part of the glass tube becomes relatively high.

An exemplary advantage according to the present invention is that it is possible to reduce the variation in operating temperature detected by the thermal fuse when an anomalous discharge occurs, so the current flow is interrupted before the temperature of any part of a glass tube, including the glass and stem region, becomes relatively high.

DESCRIPTION OF THE EXEMPLARY EMBODIMENT

Hereafter, specific exemplary embodiments will be described in reference to the drawings.

Figure 1:
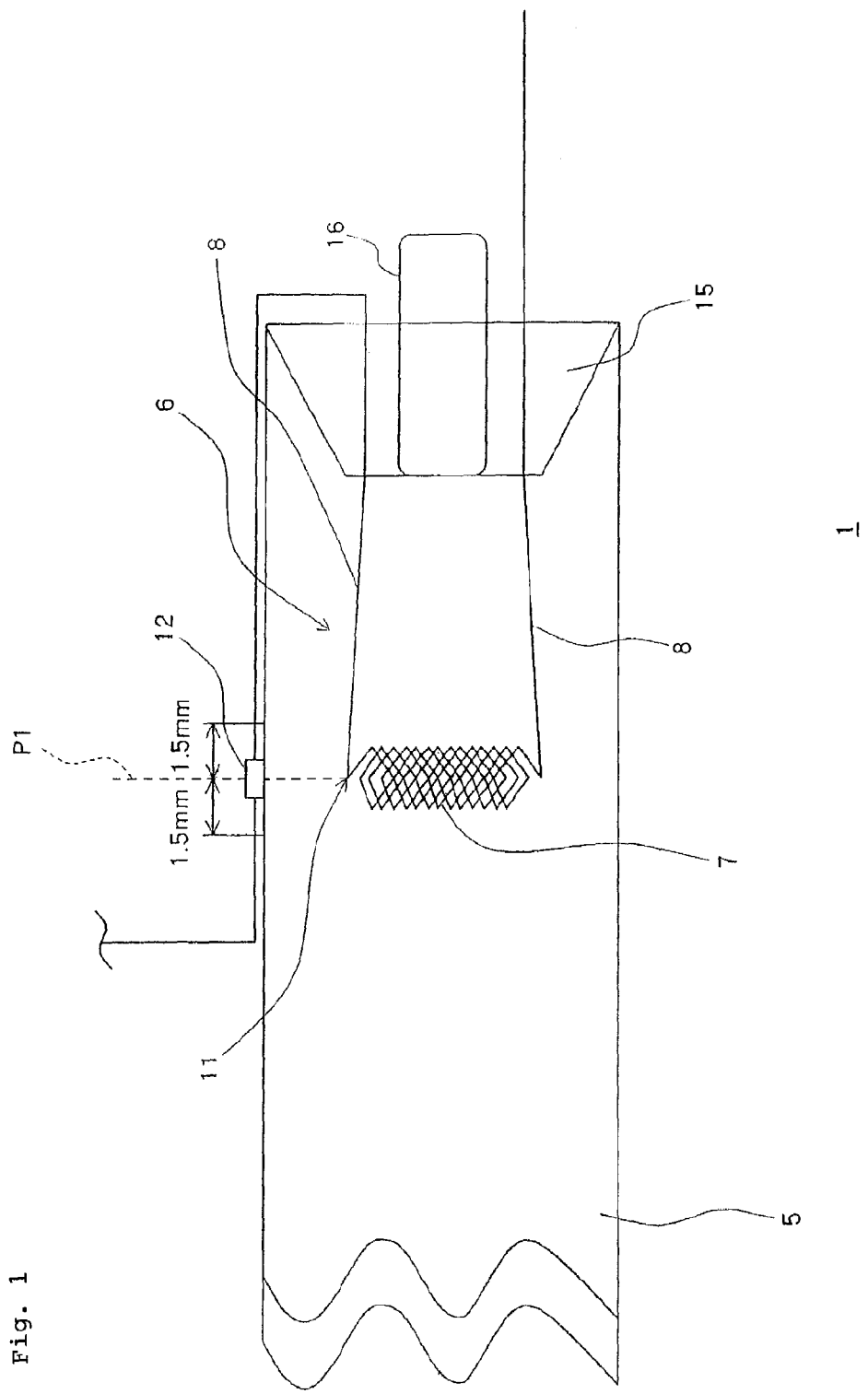
FIG. 1 is a schematic diagram illustrating a fluorescent lamp of this exemplary embodiment.

As illustrated in FIG. 1, fluorescent lamp 1 as an electric discharge lamp includes electrodes 6, inside and at each end of a cylindrical glass tube 5.

Electrode 6 comprises a filament 7 with lead wires 8 connected to each end of the filament. The other ends of lead wires 8 of electrode 6 extend through and are supported by stem 15 formed in an end portion of glass tube 5. In addition, exhaust pipe 16 communicating inside glass tube 5 is provided in stem 15.

In addition, on an outer peripheral surface of glass tube 5, thermal fuse 12 is provided near electrode 6. This thermal fuse 12 is electrically connected to lead wires 8 in series.

The position on the outer peripheral surface of glass tube 5, which extends in a radial direction of glass tube 5 from a connecting portion 11 of filament 7 and lead wire 8, serves as a reference position P1. In cases where the diameter of glass tube 5 is 8 mm or more, thermal fuse 12 (strictly speaking, the center of thermal fuse 12 in the longitudinal direction) is positioned at a distance of 1.5 mm or less from the reference position P1 in the longitudinal direction of the glass tube 5.

In addition, although FIG. 1 illustrates the thermal fuse 12 positioned only on one end side of glass tube 5, thermal fuse 12 may also be positioned similarly on the other end side of glass tube 5.

Although described later, when the position of thermal fuse 12 is more than 1.5 mm beyond reference position P1 on a glass tube 5 of 8 mm diameter, variation in operating temperature based on the position of thermal fuse 12 will increase gradually and is not preferable. In addition, when the diameter of glass tube 5 is variation in operating temperature of thermal fuse 12 becomes large relative to the distance from reference position P1. For this reason, it is preferable that thermal fuse 12 is positioned in a region in which the amount of clearance distance from reference position P1 is 1.5 mm or less.

In addition, when the diameter of the glass tube is smaller than 8 mm, even if the distance from reference position P1 exceeds 1.5 mm, the variation in the operating temperature of the thermal fuse is not significant. For this reason, on a glass tube smaller than 8 mm in diameter, the thermal fuse may be located more than 1.5 mm from reference position P1.

Regarding fluorescent lamp 1 as described above, the temperature variations near electrode 6 of glass tube 5 will be described.

Figure 2:
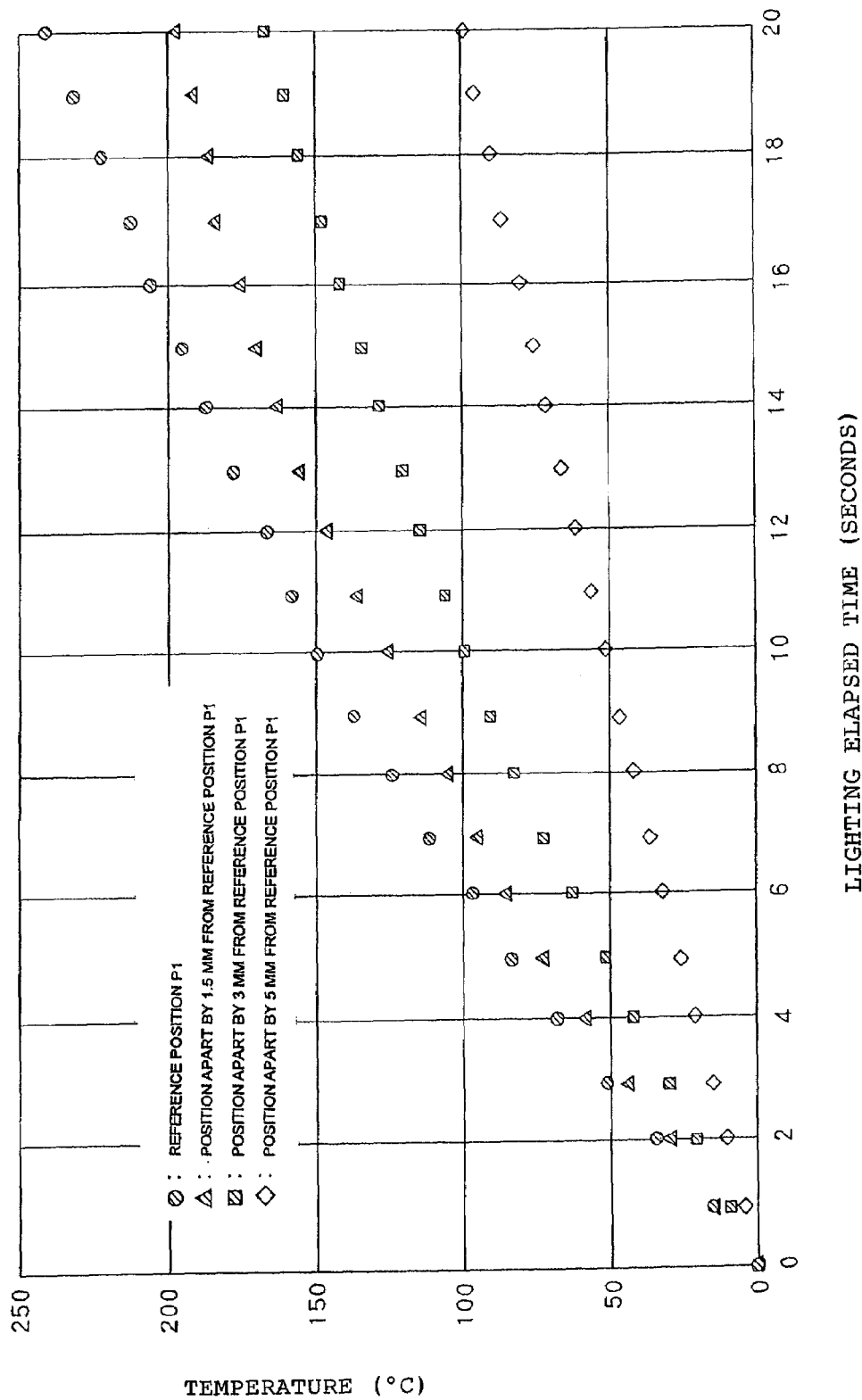
FIG. 2 is a graph for describing the relationship between the temperature of different sections of a glass tube, and the lighting elapsed time in the above-mentioned fluorescent lamp.

FIG. 2 illustrates the temperature change near electrode 6 on the outer peripheral surface of glass tube 5 in fluorescent lamp 1.

At the time an emissive material of electrode 6 was depleted, causing an anomalous discharge of fluorescent lamp 1, the temperature increase caused by the anomalous discharge was measured on the outer peripheral surface of glass tube 5 with a diameter of 8 mm. FIG. 2 illustrates the temperature increase measurement results following the lighting elapsed time at the time of the anomalous discharge by distance located from reference position P1 at 1.5 mm, 3 mm, and 5 mm.

As illustrated in FIG. 2, the temperature rise was fastest at reference position P1 and corresponds to the filament connecting to lead wire position 11, but the temperature increase was slower at further distances from reference position P1.

Only six seconds elapsed after the anomalous discharge when the temperature at reference position P1 reached 100° C. but the temperature at a distance of 5 mm from the reference position P1 was only an increase of 30° C. (from 30° C. to 60° C.). At 20 seconds the thermal fuse 12 detected a 100° C. temperature increase when positioned 5 mm away from reference position P1, whereas the temperature at reference position P1 increased to about 250° C.

Similarly, when the temperature at a distance of 1.5 mm from reference position P1 reached 100° C., the temperature in reference position P1 increased to about 120° C. Also, when the temperature at a distance of 3 mm from the reference position P1 reached 100° C., the temperature in reference position P1 increased to about 150° C.

Hence, on the outer peripheral surface of glass tube 5, and in the vicinity of electrode 6 the temperature will be significantly different depending on the distance of the thermal fuse from reference position P1, and hence, it is necessary to specify a position where the temperature is most accurately detected by thermal fuse 12.

For this reason, by the position of thermal fuse 12 provided within a range of 1.5 mm or less from reference position P1 in the longitudinal direction of glass tube 5 and installed on the outer peripheral surface of glass tube 5, the variation in the temperature which thermal fuse 12 detects is reduced. Hence, the measurement of only a partial temperature increase of glass tube 5 caused by the anomalous discharge of electrode 6 is prevented.

As mentioned above, in fluorescent lamp 1, when the diameter of glass tube 5 is 8 mm or more, thermal fuse 12 is positioned in the longitudinal direction of glass tube 5 away from reference position P1, corresponding to filament connecting portion 11, by a distance of 1.5 mm or less. Because of this construction, it becomes possible to interrupt the current supply before the temperature of a part of glass tube 5 becomes relatively high after exhaustion of the emissive material of electrode 6, which is a hot cathode, and after beginning anomalous discharge. In consequence, it is possible to reduce the variation in the operating temperature at which current supply is interrupted.

In addition, the electric discharge lamp according to the present invention is suitable for use as a light source for back lighting to illuminate a transmissive LCD panel in which it is necessary to prevent the temperature from becoming relatively high. Even if the glass and stem area do not melt, the present invention prevents variation in the operating temperature of a thermal fuse that may adversely affect components which are used in the manufacturing of a liquid crystal display panel.

While the invention has been particularly shown and described with reference to exemplary embodiments thereof, the invention is not limited to these embodiments. It will be understood by those of ordinary skill in the art that various changes in form and details may be made without departing from the spirit and scope of the present invention as defined by the claims.

What is claimed is:

1. An electric discharge lamp, comprising:
   an electrode having a filament connected at each end to lead wires which extend outside the lamp,
   a cylindrical glass tube in which the electrode is provided, and
   a thermal fuse which is positioned externally on an outer peripheral surface of the cylindrical glass tube near the electrode and is electrically connected to one of said lead wires in series,
   wherein, the cylindrical glass tube has a diameter of 8 mm or greater, wherein a point on the outer peripheral surface of the cylindrical glass tube which extends in a radial direction of the cylindrical glass tube from the connecting point of the filament to the at least one lead wire serves as a reference point, the thermal fuse is positioned at a distance of 1.5 mm or less from said reference point.

2. The electric discharge lamp according to claim 1, wherein the electric discharge lamp is a light source which illuminates a transmissive liquid crystal display panel from a back side of the liquid crystal display panel.

* * * * *